Dec. 19, 1961 P. DE SALLIER 3,013,634
VEHICLE TURNING UNIT
Filed Sept. 16, 1960
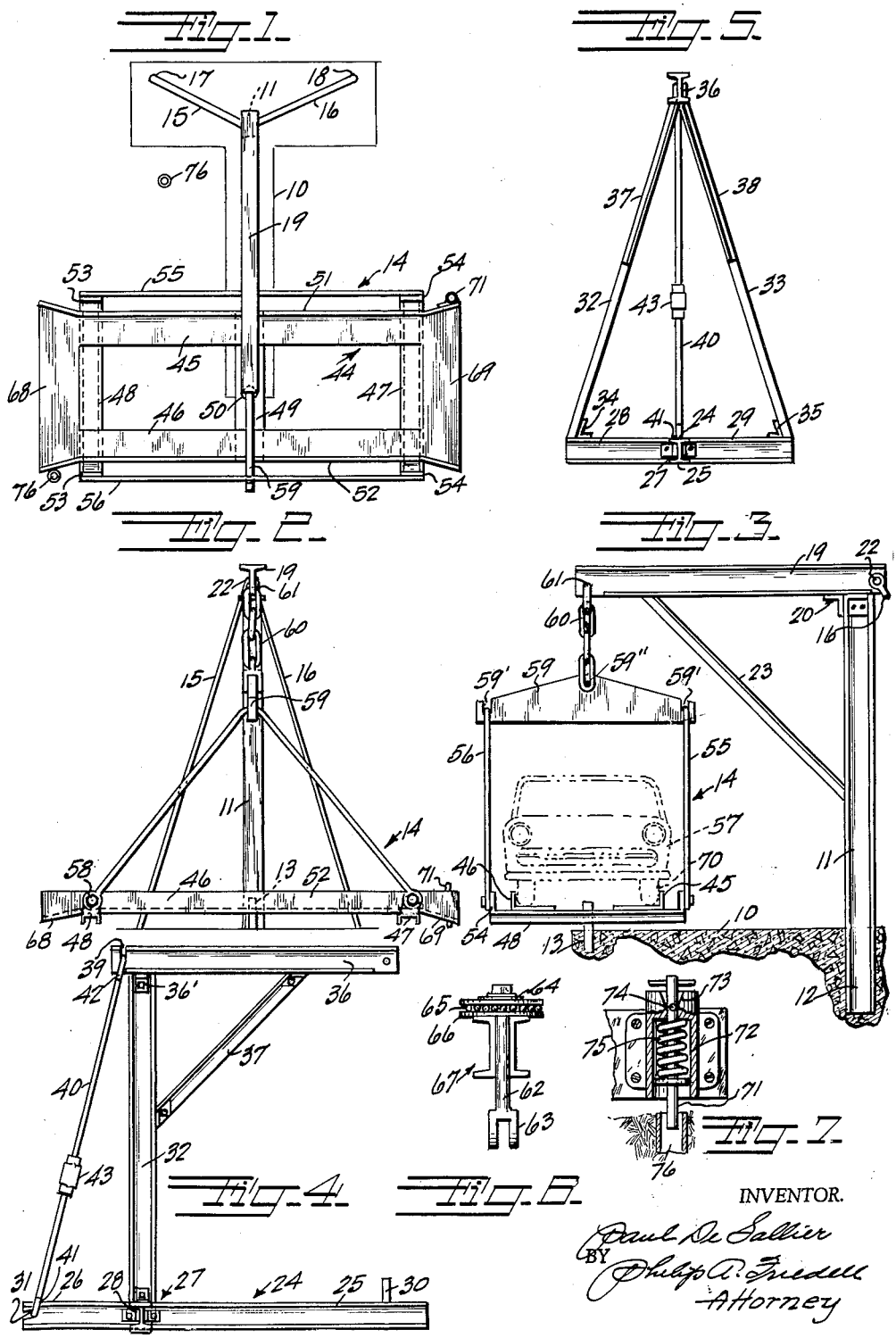
INVENTOR.
Paul De Sallier
BY Philip A. Friedell
Attorney

United States Patent Office 3,013,634
Patented Dec. 19, 1961

3,013,634
VEHICLE TURNING UNIT
Paul De Sallier, 487 Warren Ave., San Leandro, Calif.
Filed Sept. 16, 1960, Ser. No. 56,473
7 Claims. (Cl. 187—8.41)

This invention relates to improvements in means for turning automotive vehicles around, and provides a turning unit which can be set up in a conventional driveway, requiring no modifications or alterations in the driveway and surroundings other than to provide a suitable support surface laterally of the driveway, on one side only, to insure stability for the device. The invention can also be installed inside a garage or other structure, and can be installed as a permanent structure in any desired location.

Various types of turntables have been patented or otherwise disclosed, and all have disadvantages, requiring special constructions and arrangements of a permanent nature, including a turntable pit and circular rail, and the turntable itself must be made rigid and must have track wheels or rollers, and due to the weight and bearing friction, will require considerable effort for turning a vehicle. There is also the danger of running the vehicle into the turntable pit, if the turntable is not aligned with the path of the vehicle.

Applicant's vehicle turning unit overcomes all of the disadvantages mentioned in that it can be constructed in knock-down form to be set up or disassembled in any driveway or other location having a level area, or in a garage or other building structure having an area a little greater than the diagonal length of the vehicle to permit turning, and can also be installed as a fixed permanent unit in any desired location.

As is well known, there are innumerable driveways throughout the Nation having steep inclines from the thoroughfare and which are difficult and dangerous to negotiate when backing out or down the incline due to obstructions to visibility, danger to pedestrians, to possible failure of brakes, to and by oncoming traffic, and consequently also to the driver of the vehicle.

Many drivers experience difficulty and uncertainty when backing down a decline the width of which is quite restricted, and this invention provides a quick and easy way of turning the car around so that it can negotiate the decline in forward drive where the driver has a clear view of the sidewalk and any pedestrians thereon as well as any approaching vehicles, or obstructions which must be avoided.

The objects and advantages of the invention are as follows:

First, to provide a substantially frictionless turning unit for vehicles.

Second, to provide a unit as outlined which can be set up in any level portion of an installed driveway without additions or alterations to the driveway.

Third, to provide a unit as outlined with a pivotally suspended cradle for supporting the vehicle while turning.

Fourth, to provide a unit as outlined with a pivot suspension consisting of a chain.

Fifth, to provide a unit as outlined which is of the simplest possible construction, relatively simple to assemble and disassemble, and economical to construct.

In describing the invention reference will be had to the accompanying drawings, in which:

FIG. 1 is a top plan view of the invention in a permanently fixed arrangement.
FIG. 2 is a front elevation of FIG. 1.
FIG. 3 is a side elevation of FIG. 1.
FIG. 4 is a side elevation of a type which can be assembled and disassembled at will and can be set up in any driveway having a relatively level portion and sufficient clearance laterally to receive the vehicle crosswise; the cradle being omitted.
FIG. 5 is a front elevation of FIG. 4.
FIG. 6 shows a modification of the suspension pivot for the cradle.
FIG. 7 is a fragmentary view showing a suitable stop and holding arrangement for the cradle and is shown partly in section.

In its simplest form the invention includes an overhead support and a cradle pivotally suspended from the support and having supporting means and guiding means for the wheels of the vehicle, and more specifically, with a chain forming the pivotal suspending means.

In a permanent structure, when no overhead support is available, the invention includes a reclined U-shaped frame which includes a base 10 formed of concrete or other suitable material in which a standard 11 is fixed as indicated at 12, the base being provided with a centralizing and stabilizing pin 13 for the cradle 14, and this standard is suitably braced as indicated by the back stress members 15 and 16 which may consist of rod, cable, or some structural form, and which are suitably anchored at their lower ends in the base 10 at 17 and 18.

An overhead support, indicated as a cantilever beam 19 has one end fixed to the upper end of the standard 11 as indicated at 20, with the other ends of the stress members attached to the rear end of the beam as indicated at 22, and a strut 23 has its respective ends fixed to the underside of the beam and to the standard to reinforce the beam and provide rigidity. The frontal portion of this beam is provided with means for connecting a pivotal suspension element.

The form of the invention which will have the most general application due to the fact that it can be set up on any driveway which has a relatively level portion, and taken down and removed or transported to another location at will, consists of either the type described with a structural base substituted for the concrete base and with all connections releasable at will; or as shown in FIGS. 4 and 5 in which the base is of cruciform construction and consists of a structural assembly 24 including a main member having a shoe portion and a heel portion respectively 25 and 26, and at the intermediate point of which two opposed lateral structural members 28 and 29 are bolted as indicated at 27. This base is provided with a centering and stabilizing pin 30, and with means for attaching a stress member to the end portion of the heel and indicated as consisting of a slot or recess 31.

The standard is indicated as consisting of two opposed structural members indicated as channels, the upper ends of which are connected together and the respective lower ends connected to the terminal portions of the opposed lateral structural members 28 and 29 of the base as indicated at 34 and 35.

The overhead beam 36 has its rearward end connected to the apex of the standard as indicated at 36', and two struts 37 and 38 connect between the beam and the respective standard members 32 and 33, the two standard members with the base forming a triangle viewed frontally.

The overhead beam has means at its front end for attaching the pivotal suspension means, and the rearward end is provided with means for connecting a stress member and indicated as consisting of a slot or recess 39 formed in the beam. A suitable stress member, such as a rod 40 is shown as having a loop at each end as indicated at 41 and 42 to hook into the respective slots 31 and 39, and a turnbuckle 43 may be provided to facilitate erection, all parts of this structure being releasably secured together as by bolts other than the connections for the stress member which is shown as links or loops.

The cradle includes a floor portion 44 which includes a pair of opposed angle members 45 and 46 which are releasably secured to the end cross members 47 and 48 and to a central cross member 49, this central cross member having a passage formed centrally thereof to receive the centralizing and stabilizing pin 13 or 30.

The end cross members 47 and 48 extend outwardly beyond the upright or vertical legs 51 and 52 of the angle members 45 and 46 with the extensions formed upwardly spaced from the vertical legs, for attachment of the slings 55 and 56, to provide clearance for the body of the vehicle 57 as indicated clearly in FIG. 3, the slings being connected by bolts or threaded in pivots 58.

The crosshead 59 is provided at its respective ends with suitable means for attaching or connecting the slings 55 and 56 and is indicated as consisting of slots 59' formed downwardly in the member, and this crosshead also has means at 59" for connecting the suspension pivoting means shown as a length of chain 60 the other end of which is connected to the forward end of the overhead beam or support as indicated at 61, and which is the preferred form of pivotal suspension, though the type shown in FIG. 6 may be used and which consists of a pivot pin 62 having a yoke 63 at its lower end and its upper end fixed in a bearing plate 64 which bears on rollers or balls 65 which operate in the bearing plate or ball race 66 which is fixedly supported on the top of the beam 67 which is indicated as formed of opposed channels.

A ramp is provided at each end of the floor or vehicle support as indicated at 68 and 69 and declines to a plane suitably clearing the supporting surface.

It will be noted that the horizontal legs 45 and 46 form the floor or support while the vertical legs form guides for the wheels 70 of the vehicle for proper centering and alignment of the vehicle. It will also be noted that the passage 50 does not function as a bearing for the pin 13 or 30, merely functioning as a centering and stabilizing unit to prevent swaying or swinging of the cradle.

The chain 60 permits substantially frictionless turning of the cradle through a half turn, which is all that is necessary.

Stop and holding means is provided for retaining the cradle in desired orientation and is shown as consisting of a retractable pin 71 which is slidable in a sleeve 72 with the upper end of the bearing having a depression in one side as indicated at 73 for the projection 74 on the holding pin 71 which is shown as urged by a spring 75. For cooperation with the pin, a section of tubing 76 may be driven into the ground for each position desired.

Thus a vehicle turning unit is provided which can be installed permanently or for temporary use, and which, in the knockdown form requires no changes in a driveway or garage other than the setting of the pin 13 which may merely be driven into the ground.

I claim:
1. A vehicle turning unit comprising an overhead support and supporting means therefor, a supporting surface, and a cradle and pivotal suspension means therefor comprising a chain having end links with the respective end links connected to the cradle and to the overhead support to provide substantially frictionless operation, with twisting of the chain providing slight resistance as the cradle is manually rotated from a predetermined position and thereby operating to return the cradle to the predetermined position upon release, said cradle including support means and guiding means for the wheels of a vehicle, and pivotal centering means projecting upwardly from said supporting surface and in vertical alignment with the pivotal suspension means and cooperative with the cradle to maintain the cradle against swinging.

2. A vehicle turning unit comprising a frame including a base, a standard having its lower end mounted on said base, a beam having one end mounted on the upper end of said standard, bracing means for said standard and said beam, a cradle having a support portion having horizontal support members and vertical guiding members for the wheels of a vehicle, a cross head having a pivotal connection to said beam comprising a chain having end links with the respective end links connected to said cross head and said beam to provide substantially frictionless operation and slightly resisting manual rotation of the cradle from a predetermined orientation through twisting of the chain and thereby urging return of the cradle to the predetermined orientation when the cradle is released, slings connecting said cradle to said cross head, and centering means in vertical alignment with said pivotal connection and including a pin projecting upwardly from said base and cooperative with said cradle for retention of the cradle against swinging.

3. A vehicle turning unit comprising an overhead support, supporting means for said overhead support, and a base for supporting said supporting means, a cradle having support members and guide members for the wheels of the vehicle and including a supporting structure, a chain suspendedly connecting said cradle to said overhead support, and centering means cooperative between said base and said cradle for stabilizing said cradle, said chain providing substantially frictionless operation while slightly resisting manual rotation of the cradle from a predetermined rotative position and thereby, through twisting of the chain, operating to return the cradle to the predetermined rotative position when the cradle is released.

4. A vehicle turning unit comprising a cruciform structural base having a main member and a cross member connected together, said main member having a front portion and a rear portion, a standard comprising opposed structural members having their lower ends respectively connected to the end portions of the cross member and their upper ends connected together forming a triangle, an overhead beam connected adjacent one end to the upper end of said standard, opposed struts diagonally connecting between the respective opposed structural members and said overhead beam, a stress member connecting between said one end of said beam and said rear portion, a cradle including a vehicle support including opposed angles each having a horizontal leg and a vertical leg with the horizontal legs forming supports and the vertical legs forming guides for the wheels of the vehicle, a cross member and a ramp for each end of said vehicle support, said cross members including lateral extensions beyond said vertical legs, a crosshead, a sling suspended from each end of said crosshead, said slings having their lower ends connected to said lateral extensions for spacing relative to the body of the vehicle, a central cross member connected to said vehicle support, a pivotal suspension element having connections to said beam and to said crosshead for suspending said cradle in spaced relation to said front end, a central passage formed in said central cross member, and a pin projecting upwardly from said front end in vertical alignment with said pivotal suspension element and projecting into said passage for maintaining said cradle against swinging.

5. A structure as defined in claim 4, retractable engaging means mounted on said vehicle support and engageable with a supporting surface for said cruciform structural base for releasably holding said cradle in predetermined turned positions.

6. A structure as defined in claim 4, in which all connections in said unit are releasably secured for assembly and disassembly at will.

7. A structure as defined in claim 4, said pivotal connection comprising a chain connecting between the overhead beam and the crosshead for substantially frictionless pivotal suspension of the cradle.

References Cited in the file of this patent

UNITED STATES PATENTS

| | | |
|---|---|---|
| 67,257 | Bonnell | July 30, 1867 |
| 1,379,239 | Barwicki | May 24, 1921 |
| 2,527,485 | Long | Oct. 24, 1950 |